Dec. 31, 1957 B. R. SHEPARD ET AL 2,818,505

CONTROL CIRCUIT

Filed May 6, 1946 4 Sheets-Sheet 1

Inventors:
Billy R. Shepard,
Henry C. Maulshagen,
by Merton D. Morse
Their Attorney.

Dec. 31, 1957 B. R. SHEPARD ET AL 2,818,505

CONTROL CIRCUIT

Filed May 6, 1946 4 Sheets-Sheet 2

Inventors:
Billy R. Shepard,
Henry C. Maulshagen,
by Merton D. Moore
Their Attorney.

Inventors:
Billy R. Shepard,
Henry C. Maulshagen,
by Merton D. Moore
Their Attorney.

Dec. 31, 1957 B. R. SHEPARD ET AL 2,818,505

CONTROL CIRCUIT

Filed May 6, 1946 4 Sheets-Sheet 4

Inventors:
Billy R. Shepard,
Henry C. Maulshagen by Merton D. Morse
Their Attorney.

United States Patent Office 2,818,505

Patented Dec. 31, 1957

2,818,505

CONTROL CIRCUIT

Billy R. Shepard, Schenectady, N. Y., and Henry C. Maulshagen, Cambridge, Mass., assignors to General Electric Company, a corporation of New York Application May 6, 1946, Serial No. 667,526

5 Claims. (Cl. 250—27)

This invention is directed to a control circuit for providing keying voltages in a plurality of circuits.

More particularly the invention comprises a multiphase square wave generator for keying multiple circuits of a supersonic wave transmitter and receiver adapted for submerged object locating.

An object of the invention is to provide a circuit for developing interrelated keying voltages for electronic apparatus, such as a transmitter and receiver for supersonic waves.

A further object is to provde apparatus for furnishing keying voltages in a plurality of circuits to control the frequency of a supersonic wave transmitter between a plurality of frequencies of operation providing equal time of transmission for each frequency, consecutive transmission of the several frequencies, and a constant but readily adjustable repetition rate.

Another object of the invention is to provide apparatus for furnishing keying voltages in a plurality of circuits to control the frequency of operation of a supersonic wave transmitter and receiver between a plurality of frequencies wherein the receiver sensitivity will be so controlled as to reject waves, such as those caused by echoes, of each of the several frequencies during the time of transmission of each and for a predetermined time thereafter.

The control circuit, transmitter oscillator circuit, and receiver amplifier circuit shown and described herein are particularly adapted for use in a submerged-object locating equipment of the type shown and claimed in the copending application of Theodore M. Berry, filed on May 6, 1946, Serial No. 667,527, entitled "Submerged Object Locating" and assigned to the assignee of the present application.

Figure 1:
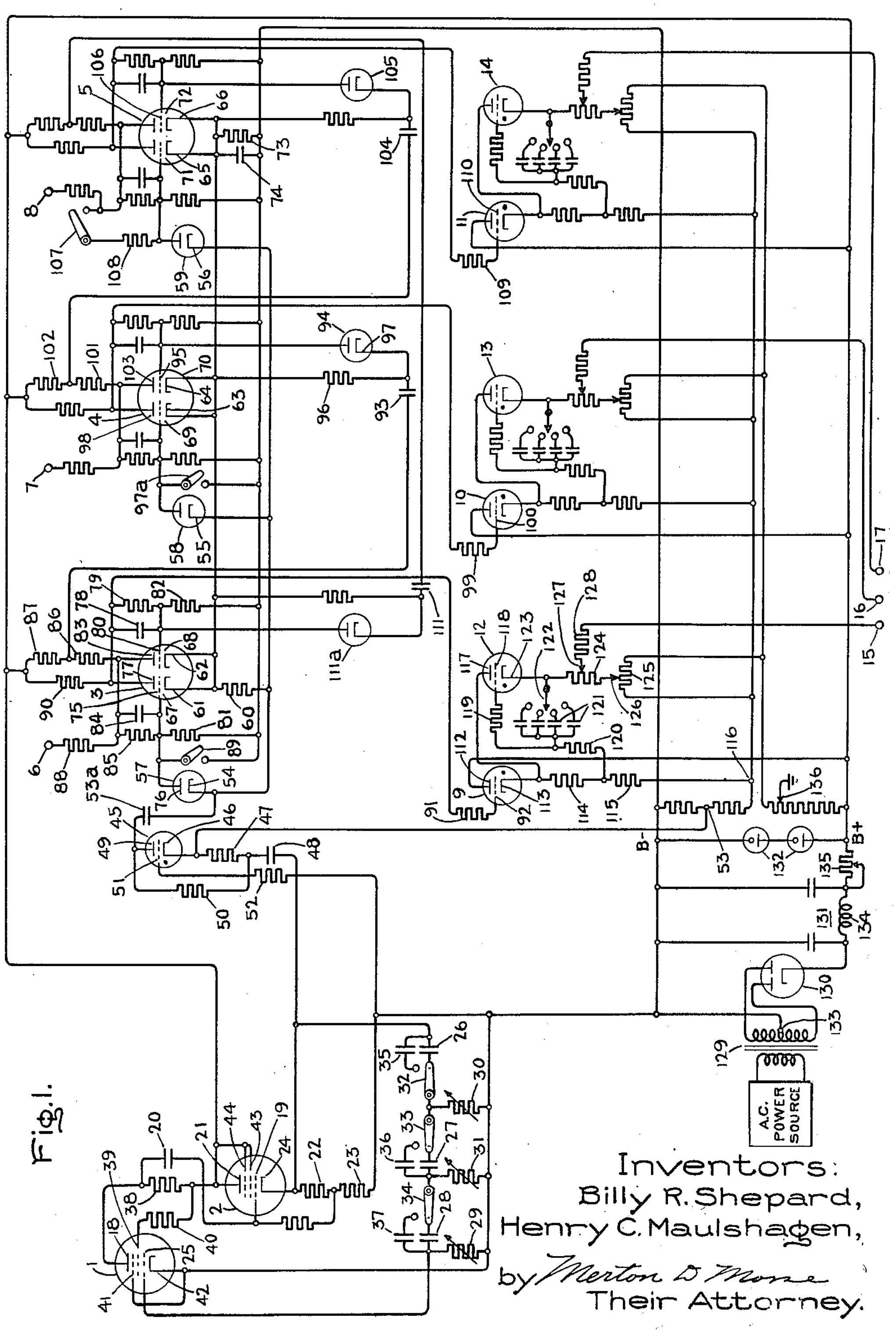
Figure 2:
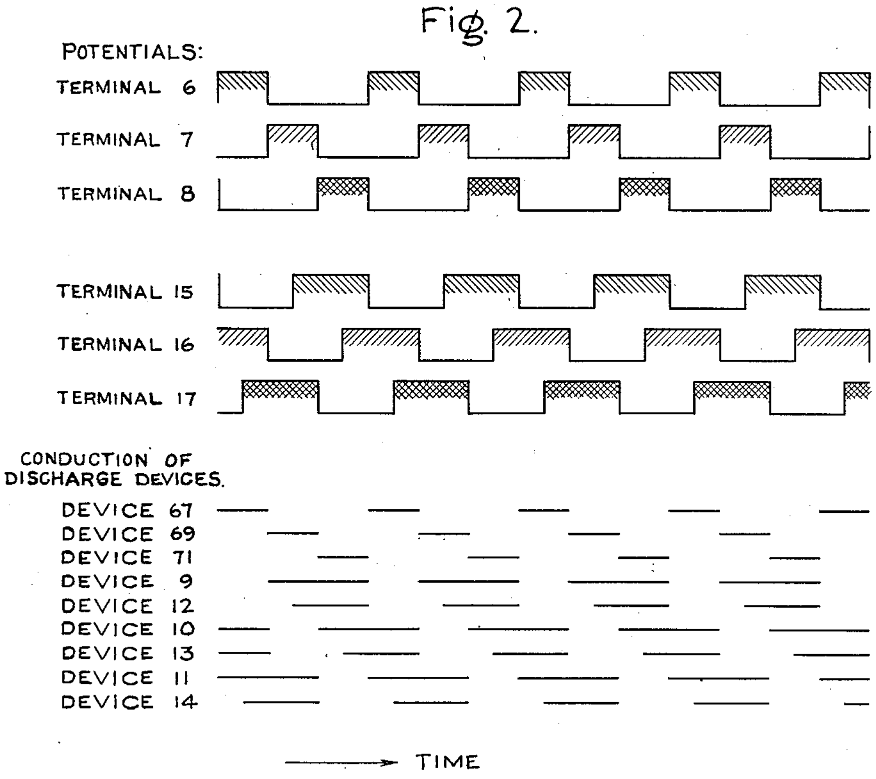
Figure 3:
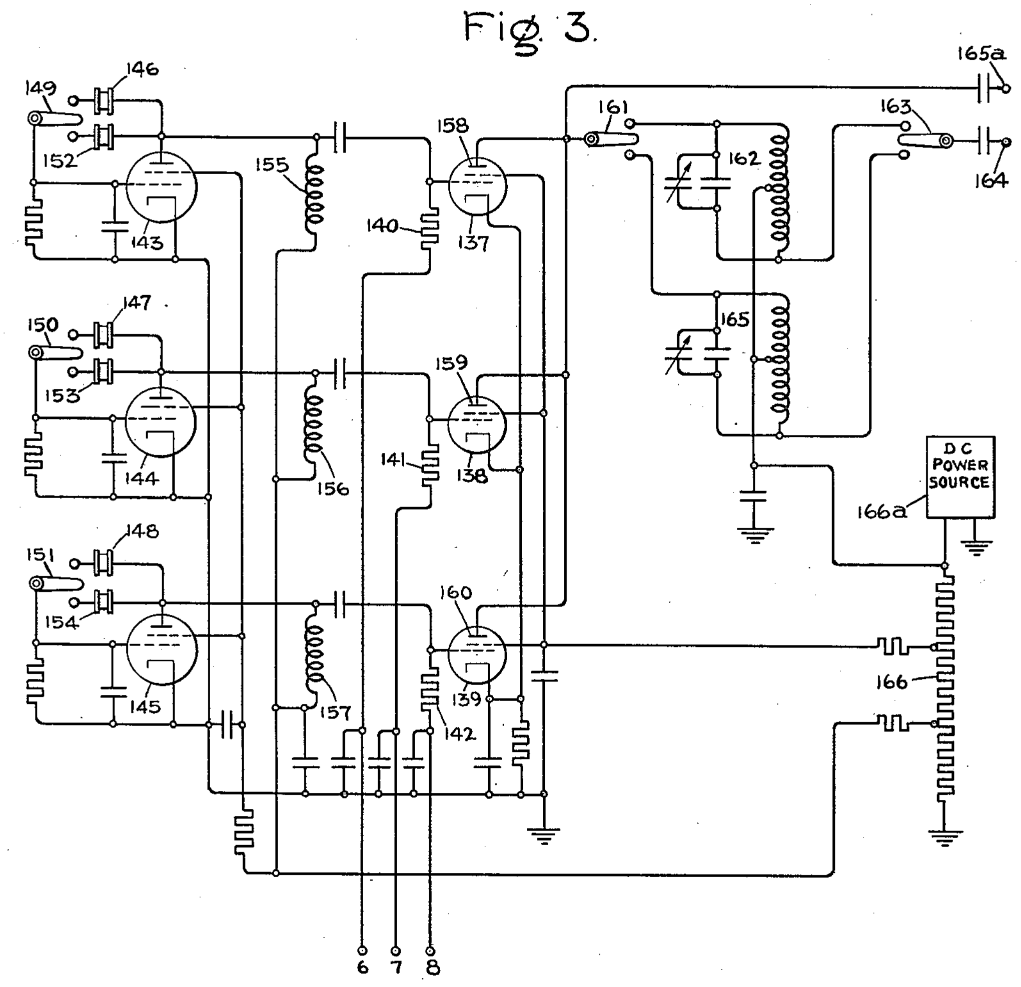
Figure 4:
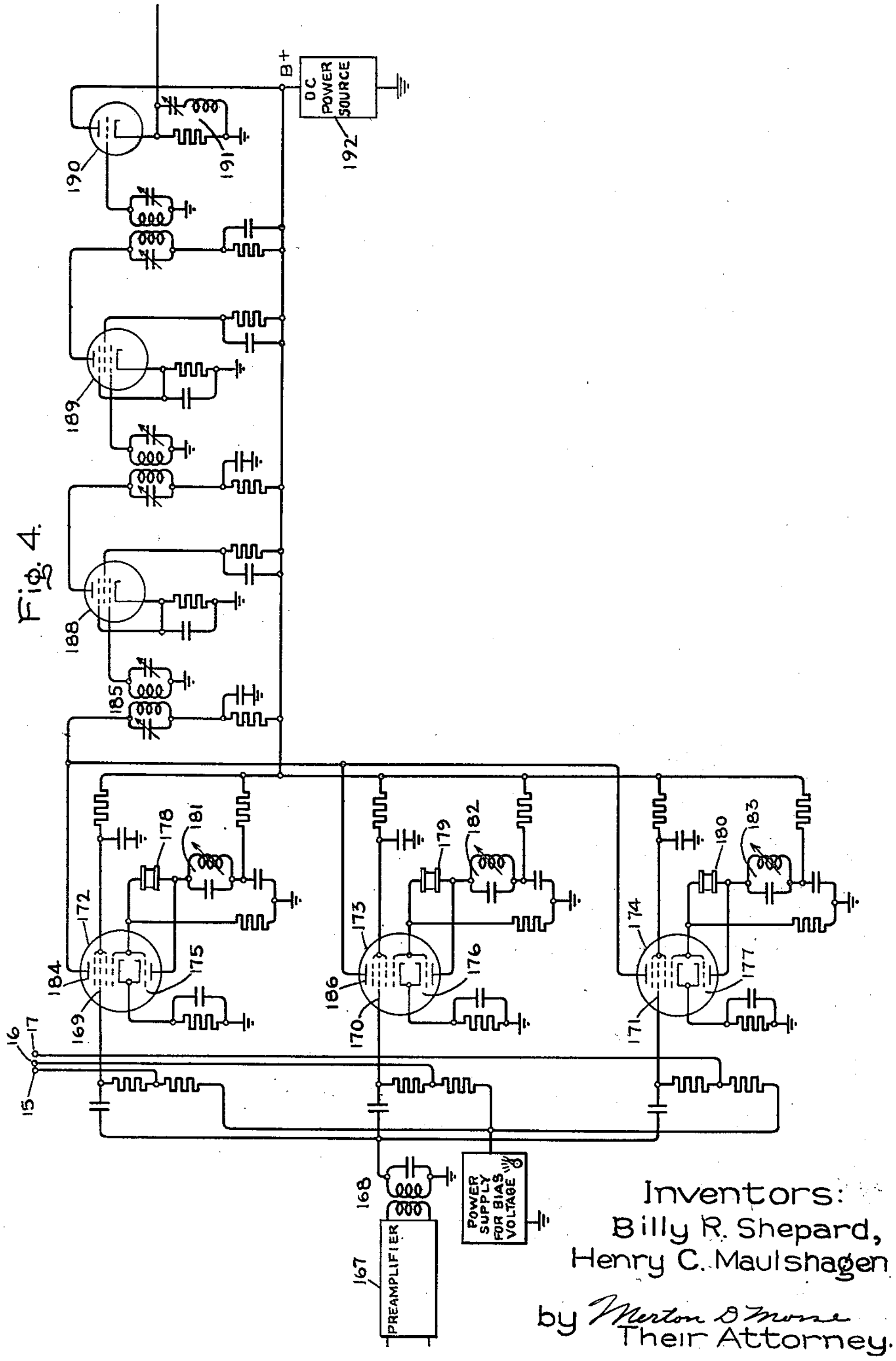

Further objects and advantages of the invention will be apparent from the following description when taken in conjunction with the drawings in which:

Fig. 1 is a circuit diagram of a control circuit or keying voltage generator according to the invention; Fig. 2 is a diagrammatic presentation of the time sequences of operation of the control circuit of Fig. 1; Fig. 3 is a circuit diagram of a supersonic frequency oscillator of a type adapted to control by the control circuit of Fig. 1; and Fig. 4 is a circuit diagram of an amplifier which may comprise a portion of a supersonic echo receiver adapted for control by keying voltages produced by the control circuit.

The control circuit shown in Fig. 1 comprises a master control oscillator, including discharge devices 1 and 2, which is coupled to control a multiphase square wave generator, which includes the dual triode discharge devices in envelopes 3, 4, and 5. The square wave generator is arranged to provide keying voltages to terminals 6, 7, and 8, to which may be connected external apparatus to be controlled such as the oscillator for a multiple frequency submerged-object locating transmitter shown in Fig. 3. The square wave generator is also arranged to provide pulses through decoupling discharge devices 9, 10, and 11 to keying devices 12, 13, and 14, which are in turn connected to provide delayed keying voltages to terminals 15, 16, and 17. The voltages appearing on these terminals may be used to control additional external apparatus, such as the frequency-sensitive multiple-frequency submerged-object locating receiver amplifier shown in Fig. 4.

In the master control oscillator portion of Fig. 1, the anode 18 of device 1 is connected to control electrode 19 of device 2 through condenser 20. Device 2 is connected in a cathode follower circuit, the anode 21 being connected directly to the source of positive anode potential with load resistors 22 and 23 connected in series from cathode 24 to the negative terminal of the potential source. A feedback connection to the control electrode 25 of device 1 from the cathode 24 is provided including series connected condensers 26, 27, and 28. The control electrode 25 is connected to the negative terminal of the potential source through a variable resistor 29, and similar connections are provided from the juncture of condensers 26 and 27 through variable resistor 30, and from the juncture of condensers 27 and 28 through variable resistor 31 to the negative terminal. The control for variable resistors 29, 30, and 31 may be conveniently ganged if desired. Switches 32, 33, and 34 are provided to furnish means of substituting condensers 35, 36, and 37 for condensers 26, 27, and 28 respectively. Anode 18 of device 1 is connected through load resistor 38 to the positive terminal of the anode potential source, and screen grid 39 of device 1 is similarly connected through a blocking resistor 40. Suppressor grid 41 is suitably connected to cathode 42, which is in turn connected to the negative power supply terminal. Device 2 is a pentode type discharge device connected as a triode with screen grid 43 and suppressor grid 44 connected directly to the anode element 21. This circuit comprises an adjustable frequency phase shift oscillator.

Electron discharge device 45, preferably of a gaseous type is provided in a pulse forming circuit for the oscillator and comprises a cathode element 46 connected through a resistor 47 and condenser 48 to cathode 24 of device 2, an anode 49 connected through resistors 50 and 47 to cathode 46, and a control grid 51 connected through resistor 52 to the negative power supply terminal. Cathode 46 is additionally connected to a tap 53 in a voltage divider network across the anode power supply and is therefore normally maintained at a potential positive with respect to the negative power supply terminal. Positive potentials produced in this circuit are of square wave shape.

To provide an output circuit, anode 49 of device 45 is connected through coupling condenser 53*a* to interconnected cathodes 54, 55, and 56 of diode discharge devices 57, 58, and 59. These interconnected cathodes are connected through a resistor 60 to interconnected cathodes 61, 62, 63, 64, 65, and 66 of triode discharge devices 67, 68, 69, 70, 71, and 72 respectively. Resistor 60 and condenser 53*a* comprise a differentiator circuit for the square wave pulses from discharge device 45. Cathodes 61 through 66 are connected together and provided with a suitable common bias resistor 73, bypassed by condenser 74, connected to the negative terminal of the anode voltage supply source. As indicated in the drawing, triode discharge devices 67 and 68 are preferably enclosed in a single evacuated envelope 3, as are triode devices 69 and 70 in envelope 4 and devices 71 and 72 in envelope 5, although separate envelopes may be provided. These devices comprise a multiphase square wave generator, the generator shown in Fig. 1 being a three-phase generator, although it will be apparent that the invention is not limited to a particular number of phases. The circuit associated with each pair of triode devices, such as the pairs shown in envelopes 3, 4, and 5 respectively, comprises an Eccles-Jordan, direct-coupled multivibrator, or "flip-flop" square wave generating circuit, the total number of such circuits provided being the same as the number of phases at which operation is desired. These circuits are hereinafter referred to as flip-flop circuits. In one of the flip-flop circuits triode device 67 acts as a phase inverter tube, having grid 75 connected to anode 76 of diode device 57 and anode 77 coupled, through condenser 78 and resistor 79 in parallel to grid 80 of triode device 68. Grids 75 and 80 are individually connected through resistors 81 and 82 respectively to the negative terminal of the anode voltage supply. Grid 75 of triode device 67 is coupled to anode 83 of triode device 68 through condenser 84 and resistor 85. Anode 83 is provided with positive operating potential from the positive terminal of the anode voltage supply through resistors 86 and 87 connected in series, and is connected to output terminal 6 through a suitable resistor 88. A starting switch 89 is arranged to short-circuit resistor 81 in the circuit of control electrode 75 of triode device 67. Anode 77 is connected through resistor 90 to the positive terminal of the power supply and through resistor 91 to control electrode 92 of decoupling discharge device 9 which forms a portion of a circuit later to be described. The juncture of resistors 86 and 87 is connected through condenser 93 and diode discharge device 94 to the control electrode 95 of triode device 70. Resistor 96 is provided from interconnected cathodes 63 and 64 to the cathode 97 of diode device 94. The remainder of the circuit associated with triode devices 69 and 70 is in all respects similar to those of triode devices 67 and 68 including the provisions of a starting switch 97*a*. Accordingly, anode 98 of device 69 is connected through resistor 99 to control electrode 100 of decoupling device 10, and the juncture of anode load resistors 101 and 102 provided in the anode potential supply connection for anode 103 of device 70 is connected through condenser 104 and diode device 105 to control electrode 106 of triode device 72. With the exception of the connections to starting switch 107, which is so arranged when closed as to short circuit the anode of device 72 through resistor 108 to the control electrode of device 71 to provide thereto a highly positive bias, the circuits associated with devices 71 and 72 are similar to those associated with devices 67 and 68 and devices 69 and 70. Connections are provided from the anode of device 71 through resistor 109 to control electrode 110 of decoupling discharge device 11 and from the juncture of the anode load resistors for device 72 through condenser 111 and diode discharge device 111*a* to the control electrode 80 of device 68.

Decoupling device 9 is arranged to provide operating potentials, developed in response to positive control electrode potentials applied through resistor 91, to a time delay circuit associated with discharge device 12, devices 9 and 12 being preferably of a gaseous type. Device 9 is arranged in a cathode follower circuit with anode 112 directly connected to the positive terminal of the power supply and cathode 113 connected through series load resistor 114 and 115 to a tap 116 on the votlage divider network across the power supply. Anode 117 of discharge device 12 is directly connected to cathode 113 and control electrode 118 is connected through resistors 119 and 120 to the juncture of load resistors 114 and 115. Condensers 121, which are of individually different capacitances, are selectively connected through switch 122 between cathode 123 and the juncture of resistors 119 and 120 to provide a resistance-capacity time delay network with resistor 120. Cathode 123 is additionally connected through resistor 124 to an adjustable portion of resistor 125 through slider 126, resistor 125 forming a portion of the power supply voltage divider network. Output pulses developed by device 12 are taken from an adjustable point on resistor 124, which forms a cathode load resistor, by slider 127 and furnished through resistor 128 to terminal 15. The circuits associated with discharge devices 10 and 13 are similarly connected to provide, in response to positive potentials applied through resistor 99, delayed positive-going pulses to terminal 16, and discharge devices 11 and 14 are similarly arranged to provide pulses to terminal 17 in response to positive potentials provided through resistor 109.

The anode power supply is conventional and comprises a transformer 129 supplied from a suitable alternating current source connected to a full wave rectifier 130, a filter network 131 and voltage regulating device 132. The voltage divider network is connected from the center tap 133 of the seconadry winding of transformer 129, which comprises the negative terminal, to the positive terminal, which is provided by a connection from the cathode of rectifier 130 through choke coil 134 of filter 131 and voltage regulating resistor 135. A ground connection is conveniently arranged to contact an adjustable point of the voltage divider through slider 136. This connection provides a convenient means for presetting the mean potential of terminals 6, 7 and 8, and terminals 15, 16 and 17, with respect to ground for purposes later described.

The operation of the control circuit of Fig. 1 is best understood by reference to Fig. 2, wherein the upper groups of curves indicate the potentials of terminals 6, 7 and 8 and the potentials of terminals 15, 16 and 17. The shaded portions in each curve indicate the time periods during which positive potentials appear on the terminals. It will be understood throughout that reference to a positive or negative potential on one of the terminals 6, 7, 8, 15, 16 and 17 refers to a potential positive or negative with respect to the mean potential of the terminal rather than with respect to the potential of some other portion of the circuit. The lower portion of the figure indicates diagramamtically the time sequence of the circuit of Fig. 1 in terms of conduction times of the discharge devices, the time of conduction for each being indicated by dashes of the proper duration. The time abscissa is common to the whole figure, the figure being primarily an exposition of the time sequence relationships existing.

Assuming the control circuit to be in the condition existing when starting switches 89, 97*a* and 107 are closed to provide strongly negative potentials to the control electrodes of devices 67 and 69 and a positive potential to the control electrode of device 71. The control oscillator comprising discharge devices 1 and 2 produces an alternating voltage of a frequency determined by the adjustments of varaible resistances 29, 30 and 31 and by the capacitors selected by switches 32, 33 and 34. In operation, as the device 2 conducts, the positive potential appearing on cathode 24 is supplied to control electrode 25 after a phase shift due to the series condensers 26, 27 and 28 and parallel resistors 29, 30 and 31. The conduction of device 1 is accordingly increased, after the phase shift interval, and a negative potential is applied through condenser 20 which reduces conduction of device 2 and provides a negative-going potential on cathode 24. The phase-shifted feedback action continues and produces a sine wave voltage at condenser 48. The sine wave voltage applied through condenser 48 to the anode 49 of gaseous discharge device 45 results in the production of a sharp negative-going pulse on the anode as the sine wave voltage swings sufficiently positive to start conduction of the device. The cathode 46 is biased slightly positive with respect to the control electrode 51 so as to stop conduction of device 45 as the anode potential supplied from the oscillator falls to the cathode bias potential near the end of the positive half wave of each oscillator cycle. Device 45 then continues non-conductive until the next positive half wave drives the anode sufficiently positive to start conduction and thereby produce the next sharp negative-going pulse as the anode abruptly approaches the cathode potential. The sharp negative-going pulses are differentiated by the combination of condenser 53*a* and resistor 60 to apply sharp negative pulses through diode discharge devices 57, 58 and 59 to control electrodes of devices 67, 69 and 71 respectively. The diode devices block any positive pulses which might otherwise reach the control electrodes.

With starting switches 89, 97*a* and 107 closed, the negative pulses have no effect, since the control electrodes of devices 67 and 69 are negatively biased by the connections through the switches 89 and 97*a*, respectively, to the negative power supply terminal and the control electrode of device 71 is biased strongly positive through switch 107 and the anode load resistors of device 72 to the positive power supply terminal, this positive bias being sufficient to prevent cut-off of device 71 by a negative pulse from the oscillator. In addition, the intensity of the negative pulses is considerably reduced by the by-passing effect of the circuits through discharge devices 57 and 58 and switches 89 and 97*a* when these switches are closed. Accordingly, as long as the starting switches remain closed, device 71 will continue conductive and terminal 8 will be maintained positive.

When starting switches 89, 97*a* and 107 are opened to start normal operation of the control circuit a stable condition exists in which device 71 is conductive, whereas devices 67 and 69 are non-conductive. This will correspond to an instant of time, in Fig. 2, at which terminal 2 is positive but terminals 6 and 7 are both negative. It will be seen from the relationships shown in Fig. 2 that this condition will continue until the next negative pulse from the oscillator is provided through condenser 53*a* and diode devices 57, 58 and 59. The negative pulse reaching the control electrode of device 71 causes the anode to start to become more positive, driving the control electrode 106 of device 72 more positive. This provides a drop in the positive potential of the anode of device 72 which produces an additional negative-going potential for the control electrode of device 71. This action, initiated by the brief negative pulse, continues until the flip-flop circuit becomes stabilized in the condition in which device 71 is non-conductive and device 72 conductive. The circuit constants are normally proportioned to provide very rapid response to the actuating pulse to cut off device 71 and to cause device 72 to conduct. The positive potential produced on the anode of device 71 is furnished to control electrode 110 to cause device 11 to become conductive. In addition the negative-going potential produced across a portion of the anode load resistance of device 72 is differentiated by condenser 111 and the associated resistor in a well known manner and is applied through diode device 111*a* as a brief negative pulse to control electrode 80 of device 68, which upsets the equilibrium of the flip-flop circuit incorporating discharge devices 67 and 68 in a similar manner to that described in connection with devices 71 and 72. Control electrode 80 starts to become negative as the pulse is applied, providing a positive-going potential on anode 83 which is applied to control electrode 75. Device 67 accordingly starts to conduct, producing a negative-going potential on anode 77 which is applied to control electrode 80 to further cut off device 68. This feedback action continues for a short time until a stable condition is reached with device 68 non-conductive and device 67 conductive. It will be apparent that the flip-flop circuit incorporating devices 67 and 68 is thus placed in condition to be directly affected by the next negative pulse from the control oscillator which reaches control electrode 75 through diode device 57. Until the next pulse is applied, as shown in Fig. 2, terminal 6 will continue positive since device 68 remains non-conductive.

Negative-going potentials are applied to the control grids of devices 9, 10 and 11 when terminals 6, 7 and 8 respectively, are made positive, and positive-going potentials are applied as the terminals are respectively made negative. Thus as will be apparent from the time relationship of Fig. 2, when device 67 cuts off as a result of the application of a negative pulse to control electrode 75, a positive-going potential is produced on anode 77 which is applied through resistor 91 to control electrode 92 of device 9. As device 9 becomes conductive, positive potentials are produced across resistors 115 and 114 to furnish operating potentials for device 12. Because of the provision of condensers 121 and resistors 119 and 120, the potential developed across resistor 115 is not immediately applied to control electrode 118 but is delayed for a time primarily determined by the resistance-capacity time constant of resistor 120 and one of the condensers 121. Switch 122 is provided to enable selection of a condenser 121 of a desired capacity to permit manual adjustments of the time constant. The delay between conduction of device 9 and conduction of device 12 to produce a positive potential on terminal 15 is indicated by the time differential between the start of dashes representing conduction of devices 9 and 12 in Fig. 2. It will be noted, however, that conduction of device 67, which is always accompanied by cutting off of device 68, results in the immediate cutoff of both devices 9 and 12 at the same instant that terminal 6 becomes positive. It will be seen that when device 9 is cut off, as a result of conduction of device 67, the positive potential on cathode 113 immediately drops and consequently no anode potential is provided for anode 117 of device 12, although the potential on control electrode 118 represented by the charge on the selected condenser 121 may remain for a period thereafter as determined by the discharge time of the condenser 121 through resistors 120 and 115, a portion of resistor 125, and resistor 124 in series. The operation of the delay circuits incorporating discharge devices 10 and 13, and 11 and 14, respectively, are each similarly operable, it being apparent that as device 69 becomes conductive devices 70, 10 and 13 are immediately cut off, and therefore devices 70, 10 and 13 can conduct only while device 69 is non-conductive, and that as device 71 becomes conductive devices 72, 11 and 14 are immediately cut off, and therefore devices 72, 11 and 14 can conduct only while device 71 is non-conductive, These relationships are apparent from a consideration of Fig. 2 and are obtained as a result of the mode of operation explained above.

The next negative pulse provided by the oscillator, when device 67 is conducting, serves to initiate cut-off of device 67, and conduction of device 68, which in turn makes terminal 6 negative and furnishes, due to the drop across resistor 87, a negative impulse through diode device 94 to control electrode 95 of device 70 to cut off device 70 and cause device 69 to become conductive. Terminal 7 then becomes positive and a negative potential is sent from anode 98 to control electrode 100 to cut off devices 10 and 13 and cause terminal 16 to become immediately negative. The next oscillator pulse by a similar sequence causes device 69 to cut off, device 70 to again become conductive, making terminal 7 negative and providing a negative potential through device 105 to control electrode 106 to cut off device 72, resulting in making device 71 conductive and terminal 8 positive. Meanwhile, device 10 is made conductive and terminal 16 will become positive after the delay time.

The sequence indicated continues indefinitely, each pulse from the oscillator causing the positive one of the three terminals 6, 7 and 8 to become negative, and the next terminal in sequence to become positive, simultaneously causing the corresponding one of terminals 15, 16 and 17 to become negative (so that terminal 15 becomes negative as terminal 6 becomes positive, terminal 16 negative as terminal 7 becomes positive, and terminal 17 negative as terminal 8 becomes positive) and starting the delay period for the already negative preceding terminal 17, 15 or 16 respectively to become positive again.

The multiple frequency oscillator shown in Fig. 3 comprises three blocking amplifier discharge devices 137, 138, and 139, of which the control electrodes are biased by the potentials appearing on terminals 6, 7 and 8, these terminals being common with similarly numbered terminals of Fig. 1. The biasing potentials are applied through resistors 140, 141 and 142 respectively. Oscillator signals are respectively applied to the control electrodes of the three blocking amplifier discharge devices from the crystal-controlled oscillator circuits comprising oscillator discharge devices 143, 144 and 145. Crystals 146, 147 and 148 control oscillations in their respective circuits at three predetermined different frequencies. As will be readily apparent, switches 149, 150 and 151 may be provided to permit alternative selection of crystals 152, 153 and 154 respectively to cause the oscillators to develop a different set of three predetermined frequencies. The anode circuits of the oscillator discharge devices include inductances 155, 156 and 157 respectively, and because of the absence of sharply tuned resonant circuits associated with the oscillators, the two crystals in each circuit may be arranged for the generation of widely different frequencies without any circuit changes other than switching from one to the other crystal. In operating apparatus, for instance, it has been found entirely practicable to develop a frequency of 710 kilocycles using crystal 146; 730 kilocycles with crystal 147; and 750 kilocycles with crystal 148, and to switch to frequencies of 210, 230 and 250 kilocycles with crystals 152, 153 and 154 respectively without other changes in the oscillator circuits. The output of each oscillator is capacity-coupled to the control electrode of a respective one of blocking amplifier tubes 137, 138 and 139. If the potential applied by the control circuit to terminal 6, which is common with terminal 6 of Fig. 1, is positive, it will be seen that device 137 will be conductive and will provide an amplifier signal at anode 158 of the frequency determined by the oscillations in device 143. However, if terminal 6 is made negative by the control circuit of Fig. 1, device 137 will be driven far beyond cut-off and no signal from oscillating device 143 will appear on anode 158. Similarly, the potentials on terminal 7 and 8, also common with similarly numbered terminals of Fig. 1, determine whether or not signals developed by oscillating device 144 and 145, respectively, appear on anodes 159 and 160 of devices 138 and 139. Anodes 158, 159 and 160 are interconnected and furnish to switch member 161 signals of the frequencies appearing on the anodes. A tuned circuit 162 is connected by switch members 161 and 163 in the upper position in the circuit to output terminal 164. Circuit 162 is relatively broadly tuned so as to pass signals of the three frequencies determined by crystals 146, 147 and 148 but to block signals of frequencies outside of the band determined by these three frequencies. If crystals 152, 153 and 154 are being utilized to determine the oscillator frequencies, switch members 161 and 163 in the downward position connect a second tuned circuit 165 into the output circuit, the tuning of circuit 165 being such that only the band of frequencies generated by crystals 152, 153 and 154 will be passed to terminal 164. A second output terminal 165*a* is so arranged as to provide a push-pull output connection with terminal 164 across either of tuned circuits 162 or 165 as selected by switches 161 and 163.

Screen grid and anode operating potentials for the discharge devices in the multifrequency oscillator are conveniently provided from a voltage divider 166 connected to a suitable source of direct current potential 166*a*. The cathodes of the discharge devices 143, 144 and 145 are directly connected to ground and the cathodes of devices 137, 138 and 139 are connected through self-biasing resistors to ground. A convenient method of properly adjusting the biasing potentials of the control electrodes of devices 137, 138 and 139 is to make the ground connections of Fig. 3 common with the ground connection shown in Fig. 1 which is adjustably connected through slider 136 to the voltage divider network. Thus the mean potentials of terminals 6, 7 and 8 with respect to ground may be readily preset by positioning slider 136 to provide proper operation of devices 137, 138 and 139, the adjustment being such that each of these devices conducts when the corresponding terminal is positive but is driven beyond cut-off when the terminal is negative.

It is intended that the signals appearing on output terminal 164 should be furnished to a submerged transducer for the production of supersonic waves for the locating of submerged objects through echo detection. Additional amplifiers for the signals although not shown may be provided between terminal 164 and the transmitting transducer. In connection with the type of operation described, reference should be made to the above identified application of Berry.

The applicable portion of a multiple frequency receiver, of a type useful with the control circuit shown in Fig. 1, is disclosed in Fig. 4. The input to the receiver from a suitable submerged listening device, such as is used in the translation of supersonic vibrations into electrical signals, is first applied to a preamplifier 167 consisting of a broadly tuned amplifier, a sharply tuned stable heterodyne oscillator and a broadly tuned mixer, for beating the incoming signals with the heterodyne oscillator frequency to produce signals of a frequency shifted to the extent determined by the heterodyne oscillator frequency. When the transmitter is of the type described above in which transmitted signals are of three different frequencies, the received echoes are of these three frequencies. The echo signals are converted to three different corresponding intermediate frequencies by the preamplifier. The oscillator frequency of the preamplifier may be conveniently adjusted to either of two widely different frequencies to enable operation on either of two bands, as for instance 210–230–250 kilocycles or 710–730–750 kilocycles. As noted above, by switching crystals in the oscillator circuits of the transmitter, Fig. 3, operation is possible on either of two different groups or bands of three frequencies each.

The output of the preamplifier, which normally includes signals of all of the three frequencies shifted to corresponding intermediate frequencies by the mixer in the preamplifier, is coupled through a broadly tuned circuit 168 to control electrodes 169, 170 and 171 of mixer devices 172, 173 and 174. Preferably included in the same envelopes respectively, are discharge devices 175, 176 and 177 which, with frequency-stabilizing crystals 178, 179 and 180 and tuned circuits 181, 182 and 183 comprise three sharply tuned oscillators. By means of a second control electrode in each of the devices 172, 173 and 174, the oscillator frequencies determined by crystals 178, 179 and 180 are heterodyned with the signals at the three different intermediate frequencies to provide signals of a single second intermediate frequency. Thus the frequency of crystal 178 is so selected that signals corresponding in frequency to those produced by oscillator 143 of Fig. 3 appear on anode 184 at the same second intermediate frequency as do signals corresponding in frequency to those produced by oscillator 144 which appear on anode 186 shifted by the frequency of crystal 179. The frequency of crystal 180 is similarly selected to beat in device 174 with signals corresponding in frequency to those produced in oscillator 145 to provide signals at the second intermediate frequency. It will be apparent that only one of the three different frequencies at which signals may be received will beat in each mixer to give the second intermediate frequency.

Only signals of the second intermediate frequency are passed by coupling transformer 185, which is relatively sharply tuned, to amplifying devices 188 and 189, with which are associated additional tuned circuits to provide further selectivity in the amplification of signals of the second intermediate frequency.

In order that echoes corresponding only to desired frequencies may be received, amplified and passed to indicating devices connected to the receiver output circuit at any one time, which is desirable for reasons more fully explained in the application of Berry referenced above, the mixer devices are arranged to conduct only upon application of positive biasing potentials from the control circuit of Fig. 1 through terminals 15, 16 and 17. Thus as terminal 6 of Figs. 1 and 3 is made positive to start transmission at the frequency of oscillator device 143 of Fig. 3, terminal 15 is made negative. The negative bias thereby applied to control electrode 169 cuts off device 172, in Fig. 4, and prevents the heterodyning of echo signals corresponding to the transmitted frequency in the only mixer stage which would, with echo signals of that frequency, produce signals of the second intermediate frequency. A short time after terminal 6 has become negative, as explained above, terminal 15 again becomes positive and device 172 again conducts to convert echo signals which correspond to the frequency of oscillator device 143 to the second intermediate frequency, so that such echo signals again appear in the output circuit of the receiver amplifier of Fig. 4. The output circuit preferably comprises an infinite impedance detector circuit including a discharge device 190 with an impedance network 191 connected in the cathode circuit, across which the envelope of the intermediate frequency appears, to provide output signals.

The output signals are preferably applied to control the intensity of the beam in a cathode ray tube, although other indicating means may be found desirable.

A suitable positive potential power supply source 192 for the receiver amplifier is provided in a normal manner.

It will be apparent that signals corresponding to any or all of three echo frequencies may be selectively or simultaneously supplied to the output circuit of Fig. 4, since by controlling the potentials of terminals 15, 16 and 17, all of the channels may be simultaneously opened or closed, or one or two channels only may be open at any time. The control circuit of Fig. 1 combined with the receiver circuit of Fig. 4 operates to instantaneously accept or reject received signals in a predetermined order or sequence. The completely electronic control of the transmission and reception of supersonic waves for submerged object locating as described herein provides flexible apparatus which can operate at maximum efficiency, the controls acting instantaneously, accurately, and within very wide limits as to the speed of the sequential operations.

Although not shown in the drawings, each discharge device should be provided in a well known manner with a suitably energized filamentary heater for the cathode element.

It will be understood that while a specific application and embodiment of the control circuit comprising the multiphase square wave generator has been described, the device is considered to be of general utility in the production of keying voltages interrelated in time sequence, although particularly adapted to use in the control of external circuits of the type shown in Figs. 3 and 4. Accordingly, the invention is intended to be limited only by the scope of the appended claims.

What we claim as new and desire to secure by Letters Patent of the United States is:

1. In a control circuit for generating keying voltages for a plurality of external circuits, a multiphase loop circuit comprising a plurality of series-coupled pulse-responsive generators, each of said generators being arranged to generate a keying voltage for an associated one of said external circuits when in a predetermined one of two stable conditions, pulse-producing means connected to provide sequential actuating pulses to all of said generators simultaneously, each of said generators being conditioned for actuation by said pulses only when in said one of said conditions, and means responsive to actuation of one of said generators for conditioning the next generator coupled thereto in the series, whereby said next generator is conditioned so as to be actuated by the next succeeding pulse provided by said pulse producing means, and separate means responsive to the condition of each respective one of said generators for providing a keying voltage starting a predetermined time after operation of each respective generator into the other condition and terminating upon return thereof to said one condition, said last means comprising a time delay circuit, an electron discharge device, and means to provide control potentials through said delay circuit to start conduction of said discharge device in response to operation of the associated generator into said other condition and abruptly to stop conduction of said device through a direct connection in response to operation of said associated generator into said one condition.

2. In combination, a source of alternating potentials, a multiphase square wave generator controlled by said source and comprising a plurality of coupled flip-flop circuits, a plurality of time delay circuits one associated with each of said flip-flop circuits, each of said delay circuits comprising a pair of gaseous discharge devices, each with a cathode, an anode and a control electrode, the control electrode of the first of each of said pairs of devices being connected to receive alternate positive and negative signals from the associated one of said flip-flop circuits in response to actuation thereof from a first to a second condition of equilibrium and from the second to the first condition of equilibrium respectively, a resistance-capacity network in each of said delay circuits connecting the cathode of said first device to the control electrode of the second of said devices to cause conduction of said second device a predetermined time after receipt of each of said positive signals, the discharge paths of said pair of devices being in series whereby conduction of said second device ceases abruptly upon receipt of each of said negative signals, and means to provide output signals corresponding to the conductive periods of each of said second devices.

3. In combination, a source of alternating potentials, a multiphase square wave generator controlled by said source and comprising a plurality of coupled flip-flop circuits a plurality of time delay circuits one associated with each of said flip-flop circuits, each of said delay circuits comprising a pair of gaseous discharge devices, each with a cathode, an anode and a control electrode, the control electrode of the first of said devices being connected to receive alternate positive and negative signals from the associated flip-flop circuit in response to actuation thereof from a first to a second condition of equilibrium and from the second to the first condition of equilibrium respectively, a resistance-capacity network connecting the cathode of said first device to the control electrode of the second of said devices to cause conduction of said second device a predetermined time after receipt of each of said positive signals, the discharge paths of each pair of said devices being in series whereby conduction of said second device ceases abruptly upon receipt of each of said negative signals, means to provide output signals corresponding to the conductive periods of each of said second devices, and means for providing from each of said flip-flop circuits pulse voltages to separate output circuits starting as each flip-flop circuit is actuated from said second to said first condition and terminating upon actuation from said first to said second condition.

4. In a control circuit for generating keying voltages for a plurality of external circuits, a multiphase loop circuit comprising a plurality of series coupled pulse responsive generators, each of said generators being arranged to generate a keying voltage for an associated one of said external circuits when in a predetermined one of two stable conditions, pulse producing means connected to provide sequential actuating pulses to all of said generators simultaneously, each of said generators being conditioned for actuation by said pulses only when in said one of said conditions, means for initially maintaining one of said generators in said one condition, means responsive to actuation of said one generator for conditioning the next generator coupled thereto in the series to be actuated by the next succeeding pulse provided by said pulse producing means, and delayed keying voltage producing means connected to one of said generators and operative in response to operation of said last-mentioned generator into said other stable condition to supply to another of said external circuits a keying voltage delayed by a predetermined time interval, said delayed keying voltage producing means being operative to terminate said delayed keying voltage abruptly in response to operation of said last-mentioned generator into said one condition.

5. In a control circuit for providing keying voltages in timed relation to two groups of external circuits, the combination of a voltage pulse producing means, a multiphase square wave generator controlled by pulses from said pulse producing means and comprising a loop of sequentially operable square wave generating circuits each having two conditions of stable equilibrium of unequal duration and operating into the shorter of said conditions in sequence in response to successive pulses from said pulse producing means, and each including means for providing when in said shorter condition a keying voltage to a separate external circuit of the same group of external circuits, and separate delayed keying voltage producing means responsive to the condition of an associated one of said square wave generating circuits for providing a keying voltage to a separate external circuit of the other group of external circuits starting a predetermined time after the operation of said associated square wave generating circuit into the longer condition of equilibrium, and said delayed keying voltage producing means being operative to extinguish said delayed keying voltage in response to operation of said associated square wave generating circuit into said shorter condition of equilibrium.

References Cited in the file of this patent

UNITED STATES PATENTS

| | | |
|---|---|---|
| 1,918,252 | Dunham | July 18, 1933 |
| 2,048,081 | Riggs | July 21, 1936 |
| 2,158,285 | Koch | May 16, 1939 |
| 2,199,179 | Koch | Apr. 30, 1940 |
| 2,272,070 | Reeves | Feb. 3, 1942 |
| 2,306,386 | Hollywood | Dec. 29, 1942 |
| 2,369,662 | Deloraine et al. | Feb. 20, 1945 |
| 2,371,988 | Granquist | Mar. 20, 1945 |
| 2,384,379 | Ingram | Sept. 4, 1945 |
| 2,400,796 | Watts et al. | May 21, 1946 |
| 2,402,432 | Mumma | June 18, 1946 |
| 2,403,918 | Grosdoff | July 16, 1946 |
| 2,404,918 | Overbeck | July 30, 1946 |
| 2,405,231 | Newhouse | Aug. 6, 1946 |
| 2,409,229 | Smith, Jr. et al. | Oct. 15, 1946 |
| 2,426,454 | Johnson | Aug. 26, 1947 |